United States Patent [19]
Würl et al.

[11] Patent Number: 5,362,227
[45] Date of Patent: Nov. 8, 1994

[54] INJECTION MOLDING MACHINE

[75] Inventors: Ernst Würl, Höttingen; Helmut Schreiner, Nürnberg, both of Germany

[73] Assignee: Mannesmann Aktiengesellschaft, Dusseldorf, Germany

[21] Appl. No.: 93,388

[22] Filed: Jul. 19, 1993

[30] Foreign Application Priority Data

Jul. 17, 1992 [DE] Germany ............................. 4224195

[51] Int. Cl.⁵ ............................................. B29C 45/00
[52] U.S. Cl. ................... 425/574; 264/328.11; 425/589
[58] Field of Search ............... 264/328.11; 425/574, 425/589

[56] References Cited

U.S. PATENT DOCUMENTS

| | | | |
|---|---|---|---|
| 3,024,498 | 3/1962 | Bronnenkant et al. | 425/574 |
| 3,162,900 | 12/1964 | Huelskamp | 425/574 |
| 3,600,755 | 8/1971 | Cook, Jr. | 425/574 |
| 3,806,294 | 4/1974 | Hehl | 425/574 |
| 4,386,903 | 6/1983 | Wybenga | 425/574 |
| 4,699,581 | 10/1987 | Nagasaka et al. | 425/574 |
| 5,007,816 | 4/1991 | Hehl | 425/574 |

FOREIGN PATENT DOCUMENTS 2504719 8/1976 Germany ............................ 425/574

*Primary Examiner*—Charles S. Bushey
*Attorney, Agent, or Firm*—Cohen, Pontani, Lieberman, Pavane

[57] ABSTRACT

An injection molding machine includes a screw unit provided with a drive and mounted through a carrier on a base frame. The screw unit can be connected to a tool clamping plate in a frictionally engaging manner. The carrier includes a carriage which can be moved on the base frame by at least one moving unit fastened on the tool clamping plate. The carriage has a front carriage portion with at least one recess provided in the front carriage portion. A yoke provided at the opening side of the housing part can be placed in a positively engaging manner into the recess. The rear housing part of the plasticizing unit is connectable through support and centering elements to an undercarriage which is slidable on the base frame.

8 Claims, 2 Drawing Sheets

INJECTION MOLDING MACHINE

BACKGROUND OF THE INVENTION

1. Field of the Invention

The present invention relates to an injection molding machine in which a screw unit which is provided with a drive is mounted through a carrier on a base frame, wherein the screw unit can be connected to a tool clamping plate in a frictionally engaging manner.

2. Description of the Related Art

An injection molding machine of the above-described type is known, for example, from German Patent No. 32 49 092. This known injection molding machine has an injection unit which includes a screw in a heating cylinder and is supported by a housing provided on the machine bed. An axial forward or rearward movement of the injection unit presses the injection unit against the tool or moves it away from the tool. The injection molding procedure is carried out with different lengths and diameters of the plasticizing cylinders. In the known machine, different lengths of the plasticizing cylinder are compensated by appropriately increasing the displacement stroke. As a result, the machine has the disadvantage that the use is cumbersome when large differences in the lengths of the plasticizing cylinders occur. Moreover, it becomes difficult to mount plasticizing cylinders which exceed scheduled lengths.

In very long plasticizing cylinders, it may be necessary to support the front portion of the screw. An example of this type is known from DE-OS 40 04 478 in which the plasticizing unit is not only supported on the gear housing but also on a fork-type support. The fork-type support and the housing rest on a common base which is moved by a drive on sliding guide means until contact is made with the tool and away from the tool. The concept of the example described in DE-OS 40 04 478 and in German Patent No. 32 45 092 is the same, so that the disadvantages are also the same.

U.S. Pat. No. 3,169,275 discloses an injection molding machine in which the portion of the housing of the plasticizing unit with the outlet opening rests on a carriage-type stand or pedestal and the housing part at the base end is in connection with another stand which can be driven by a motor. The length of the housing of the plasticizing unit can be changed by means of coaxially arranged cylinders, wherein the screw is axially supported during the injection procedure and the plastics material compound is pressed similar to an extruder out of the plasticizing unit by telescoping the plasticizing unit together. For this purpose, in the head part of the plasticizing unit, a frame is formed of the elements crossbeam, head flange and connecting rods, wherein this frame facilitates the length changes by means of hydraulic units. These length changes can be carried out only within narrow limits and are closely linked to the injection operation. The plasticizing unit is pressed against the tool clamping plate essentially through connecting rods by means of drives which are arranged far away from the tool clamping plate.

The injection molding machine known from U.S. Pat. No. 3,169,275 is not capable of using plasticizing units having substantially different diameters mid lengths without reassembly, wherein simple instructional means achieve high accuracy of guidance and the possibility of introducing large drive forces.

The injection molding machine known from the aforementioned U.S. patent does not have a carriage which is engaged over the shortest distance at the front side by a moving unit fastened on the tool clamping plate and is pressed against the tool plate. Morever, the machine does not have elements which facilitate a placement of the housing part with the opening in a positively engaging manner in the front portion of the carriage which would allow a simple change of the acting point of the housing of the plasticizing cylinder which itself has a fixed length.

The machine further does not include means for connecting plasticizing housings of different lengths and different diameters to an undercarriage which is slidable on a base frame.

DE-A-15 54 768 discloses an injection molding machine for plastics materials which can be pivoted about a pivot point and whose front housing part is pressed by a screw connection against an insert of the tool clamping plate.

DE-A 15 54 768 does not disclose a carriage which facilitates in a simple manner a fastening with positive engagement of the housing part with opening. Also, there are no elements which would essentially avoid reassembly of plasticizing units even when the diameters and lengths are substantially different.

SUMMARY OF THE INVENTION

Therefore, it is the primary object of the present invention to provide an injection molding machine of the above-described type in which it is possible with simple structural means to utilize plasticizing units having substantial differences in diameter and length, wherein a high accuracy of guidance and introduction of large pressing forces are possible.

In accordance with the present invention, the carriage can be moved on the base frame by means of at least one moving unit fastened on the tool clamping plate. The carriage has a front carriage portion and at least one recess provided in the front carriage portion. A yoke provided at the opening side of the housing part can be placed in a positively engaging manner into the recess. The rear housing part of the plasticizing unit is connectable through holding and centering elements to an undercarriage which is slidable on the base frame.

Thus, the present invention proposes a drivable carriage which can be connected to the opening side housing part of the plasticizing unit and is in connection through the housing with an undercarriage on which the screw drive is essentially arranged.

By using a carriage and an undercarriage as a second support, the plasticizing unit is securely supported.

Because of the arrangement of the driven carriage in the vicinity of the housing opening of the plasticizing unit, it is possible to securely introduce even high pressing forces of the screw nozzle into the tool clamping plate. By dividing the support of the plasticizing unit into a carriage and an undercarriage independent of the carriage, it is possible to use plasticizing units of any chosen size. The receiving elements in the front portion of the carriage adapted to the individual housings determine equal lengths of travel toward the tool clamping plate. Accordingly, the undercarriage which is independent of the carriage can be freely moved in dependence on the length of the plasticizing cylinder. Different diameters of the plasticizing units can be compensated by additional adaptors which can be replaced as necessary while the center axis of the screw remains constant. Locking of the plasticizing unit can be automated by means of a spreading unit which can be actuated by means of an adjusting drive. This can be achieved with a minimum of structural requirements if the additional piston-cylinder unit used for moving the carriage is arranged in series with the piston-cylinder unit used for moving the undercarriage. During operation, the additional piston-cylinder unit for moving the carriage rests with frictional engagement on the undercarriage and moves the carriage and, thus, the holding element toward a flange of the plasticizing unit. Accordingly, the plasticizing unit is clamped with its yoke in the undercarriage and to the flange of the carriage by a spreading unit, for example, a piston-cylinder unit.

The introduction of the pressing forces of the housing opening against the tool results in hardly any length changes due to temperature changes and, thus, changes in the pressing force. There are no restrictions to thermal length changes in the remaining parts of the housing of the plasticizing unit. In accordance with a particularly advantageous feature, the undercarriage connected to the rear is mounted on sliding blocks in order to facilitate a horizontal movement which is especially free of obstructions.

Since it is possible to use almost any length depending on the plasticizing units and/or the diameter of the screws even if used already in only one machine size, the manufacturer of plastics material products can use plasticizing units which are adapted to the respective plasticizing output. The required series of screw diameters is only required once for all intended machine sizes because the flexible support spacing for the plasticizing units affects the length adjustment and the adjustment of the support diameters is ensured by support and centering elements. Moreover, the plasticizing units can be standardized more simply and the number of components which must be kept available in storage are reduced. Since the machine does not limit the diameter or the size, plasticizing units can be used which have a constant plasticizing output which can be determined in a simplified manner from the ratio of screw length to screw diameter.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
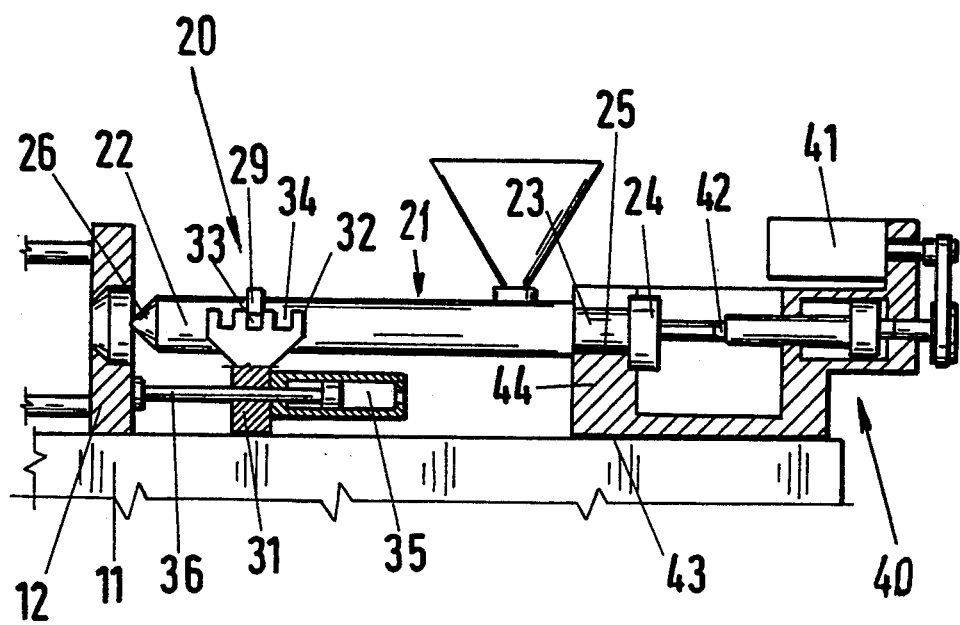
FIG. 1 is a side elevational view, partly in section, of an injection molding machine with plasticizing units supported by support and fixing elements.
Figure 2:
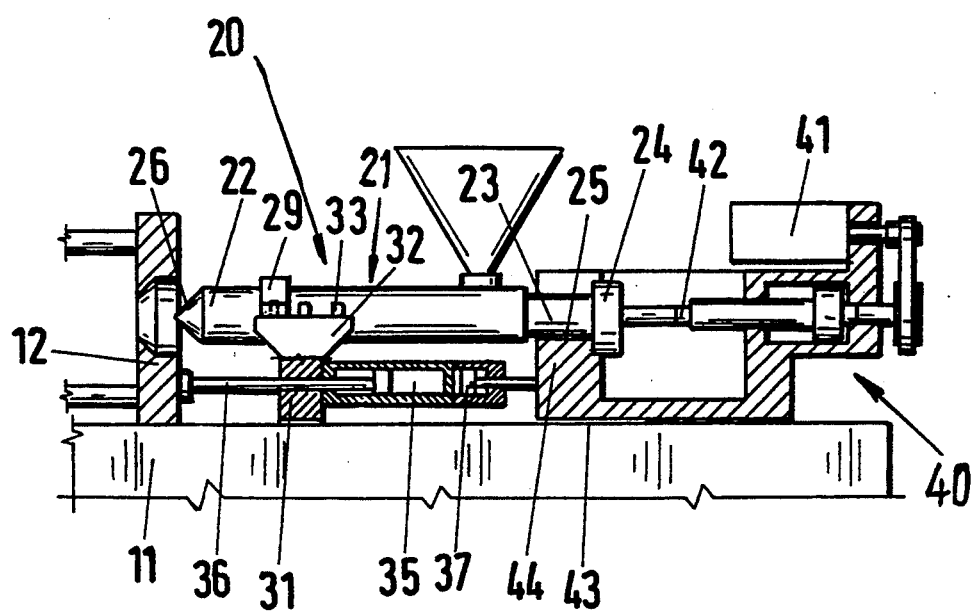
FIG. 2 shows the plasticizing unit of FIG. 1 supported by a spreading unit.

FIGS. 1 and 2 of the drawing show the fixed components 10 of the injection molding machine: the base frame 11 and the tool clamping plate 12.

A carrier constructed as carriage 31 and an undercarriage 40 are horizontally movable on the base frame 11. Receiving elements 33 for receiving a plasticizing unit 20 are provided at the front carriage portion 32. In the illustrated embodiment, recesses 34 are provided. A piston-cylinder unit 35 is arranged on the carriage. The piston rod 36 of the piston-cylinder unit 35 is fastened on the clamping plate 12 and moves the carriage 31 and, thus, the plasticizing unit 20 toward and away from the clamping plate 12.

The drawing further shows a housing 21 of the plasticizing unit 20. A yoke 29 is mounted on the housing part 22 with the opening. This yoke 29 can be connected in a positively engaging manner with the recesses 34 of the receiving member or carrier. During operation of the plasticizing unit, the housing opening 26 is pressed against the clamping plate 12.

Support and center elements 24 are provided at the rearward housing part 23. The housing 21 of the plasticizing unit 20 can be connected to the undercarriage 40 by means of the support and centering elements 24.

The undercarriage 40 is constructed in such a way that it can receive the screw drive 41. A coupling 42 for uncoupling the screw drive 41 and the plasticizing unit 20 is provided at between these two components. The undercarriage 40 additionally has sliding elements 43 which facilitate sliding and guidance without obstruction of the undercarriage 40 on the base frame 11 in horizontal direction.

As illustrated in FIG. 2, the plasticizing unit is supported by a spreading device. The spreading device is composed of a clamping element 37 which, in the illustrated embodiment, is constructed as a piston-cylinder unit. For simplifying the construction, the clamping element 37 is supported on the piston-cylinder 35 provided for displacing the carriage 31. The other end of the clamping element 37 is fastened to the portion of the undercarriage 40 which is constructed as a fork-type member 44. The fork-type member 44 rests opposite the clamping plate 12 against a support element 24 constructed as a flange.

The receiving elements 33 of the carriage 31 are constructed in the present case in the form of bolts which correspond to recesses in the yoke 29.

The invention is not limited by the embodiments described above which are presented as examples only but can be modified in various ways within the scope of protection defined by the appended patent claims.

We claim:

1. An injection molding machine comprising a base frame and a plasticizing unit mounted on the base frame, the plasticizing unit comprising a drive and an opening side housing part and a rear housing part, a tool clamping plate being connectable in a frictionally engaging manner to the plasticizing unit, a carriage having a front carriage portion resting on the base frame for moving the opening side housing part of the plasticizing unit toward and from the tool clamping plate, at least one moving unit fastened on the tool clamping plate for moving the carriage on the base frame, the front carriage portion having at least one recess, a yoke provided on the opening side housing part being engageable in a positively engaging manner in the at least one recess, an undercarriage being slidably mounted on the base frame, and support and centering elements for connecting the rear housing part of the plasticizing unit to the undercarriage, the support and centering elements having lengths and diameters capable of releasably connecting the rear housing part of the plasticizing unit to the undercarriage in a manner compensating various outer diameters of the plasticizing unit housing.

2. The injection molding machine according to claim 1, wherein the moving unit fastened on the tool clamping plate comprises a piston-cylinder unit with a piston rod, the piston rod of the piston-cylinder unit being guided by the carriage.

3. The injection molding machine according to claim 1, wherein the at least one recess of the opening side housing part corresponds in the location thereof with a predetermined spacing of the yoke from a housing opening of the plasticizing unit.

4. The injection molding machine according to claim 1, comprising sliding elements on the base frame for horizontally displacing the undercarriage with little force.

5. The injection molding machine according to claim 1, wherein the undercarriage comprises components for receiving a screw drive connectable to the plasticizing unit.

6. The injection molding machine according to claim 1, wherein the support elements comprise a flange mounted on the rear end of the plasticizing unit, further comprising spreading means for connecting in a frictionally engaging manner the flange to the yoke of the plasticizing unit.

7. The injection molding machine according to claim 6, wherein the spreading means comprises a linear drive.

8. The injection molding machine according to claim 7, wherein the linear drive is a piston-cylinder unit.

* * * * *